No. 774,765. Patented November 15, 1904

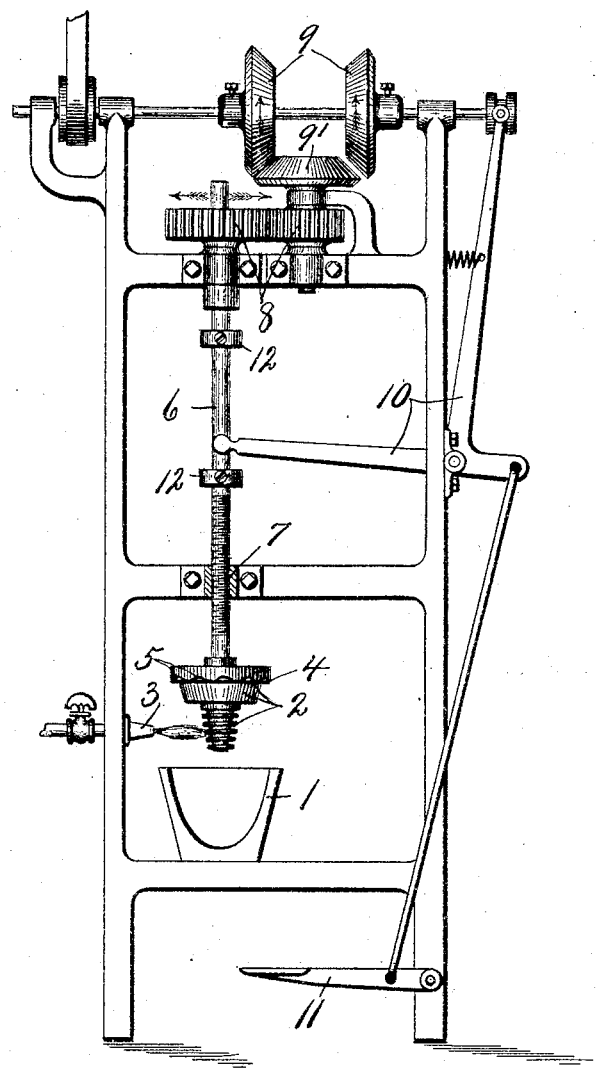

UNITED STATES PATENT OFFICE.

FRED M. LOCKE, OF VICTOR, NEW YORK.

ART AND METHOD OF MANUFACTURING EARTHENWARE INSULATORS.

SPECIFICATION forming part of Letters Patent No. 774,765, dated November 15, 1904.

Application filed October 14, 1902. Serial No. 127,213. (No model.)

*To all whom it may concern:*

Be it known that I, FRED M. LOCKE, of Victor, in the county of Ontario, in the State of New York, have invented new and useful Improvements in the Art and Method of Manufacturing Earthenware Insulators, of which the following is a full, clear, and exact description.

My invention relates to improvements in the art and method of manufacturing earthenware insulators and similar articles having depressions or interior chambers.

In the manufacture of insulators under the various processes commonly known as the "dry process" and the "wet process" it is found that the finished article in the dry process is more or less porous and of unequal density, is frequently irregular in outline, and in most instance when broken is found to contain minute air pockets or holes of various sizes, while the exposed surfaces may be entirely free from imperfections and give the insulator the appearance of solidity and uniform density. This porosity or unequal density of the material renders the insulator unsafe and practically useless, particularly under the test of high-voltage currents to which they may be subjected.

My object therefore is to treat the earthen matter in such manner that when the insulator is finished it is free from the imperfections previously mentioned, is practically impenetrable by electric currents of the highest voltage, and can be produced at a much less cost than under either of the processes now in general use.

In carrying out the objects stated I preferably provide a body of plastic porcelain or suitable clay which is sufficiently moist to form a homogeneous mass, being distinguished from the material used in the dry process by its freedom from dust and greater cohesiveness. After the clay has been thus prepared a sufficient quantity to form the insulator desired is placed in a suitable mold, and a die of the desired cross-sectional contour is then rotated into and out of the material in the mold, thereby further compressing said material and at the same time giving it the shape of the contiguous faces of the mold and die.

Prior to or during the descent of the plunger or die into the plastic body the die is heated and enters the plastic body under a rotary motion in this heated condition, the rotary motion giving form to the insulator and at the same time trimming and smoothing the surfaces in contact therewith, and the heat of the plunger is transmitted to the adjacent surfaces of the plastic material and causes the same to shrink or slightly recede from the plunger, and therefore permits the free removal of the plunger without liability of the material adhering thereto and then withdrawing the heated plunger with a rotary motion and simultaneously introducing air against the heated surface of the material. In order to clearly demonstrate this the process of forming the interior and other contours of the insulator, I have shown an apparatus similar to that set forth in my allowed application, Serial No. 59,289, filed May 8, 1901, and consisting, essentially, of a suitable mold 1 for receiving the plastic clay or porcelain of which the insulator is formed and a rotary threaded plunger 2, heated by any suitable means, as a gas-burner 3, the threaded die or plunger having an annular flange 4 and trimming edges 5 for removing the superfluous material and giving a smooth finish to the edges of the insulator.

The plunger shown is for forming interior threads in the plastic body or insulator and is mounted on a rotary shaft 6, which is provided with threads having a pitch similar to that of the plunger and engaged with a threaded bearing 7, so that when the shaft is rotated it is also moved endwise automatically for screwing the threaded plunger into and out of the plastic body. The means for controlling this rotation is here shown as consisting of intermeshing gears 8, friction-clutch sections 9 and 9', and a rock-lever 10, connected to a pedal 11, one arm of the lever 10 being interposed between collars 12 on the shaft 6. The clutch-sections 9 are mounted on a continuously-rotating shaft and are moved alternately into engagement with the section 9' to rotate the shaft 6 in reverse directions for the purpose of screwing the die 2 into and out of the plastic body.

The mode of operation is as follows: The pedal 11 is first depressed to rock the lever 10, which is connected to and moves the clutch-sections 9 axially, one section engaging the section 9' and through the gears 8 rotates the shaft 6 and plunger 2 to screw the same into the plastic body a predetermined distance, whereupon the upper coller 12 engages and rocks the lever 10 in the opposite direction to automatically shift the other section 9 into engagement with the section 9' for reversing the rotation of the shaft 6 and unscrewing its plunger out of the plastic body, and as soon as this is effected the lower collar 12 rocks the lever to its normal position, in which the sections 9 are both disengaged from the section 9' and the plunger is at rest ready for the repetition of the operation described. After the insulator is thus formed it is removed from the mold, and when wholly or partially dried it is then glazed and is subsequently fired or vitrified.

It is now apparent that this method of manufacturing insulators comprises the following steps: first, liquefying and mixing the material of which the insulator is to be formed; second, partially solidifying the liquid material by expelling part of the moisture, leaving the mass in a plastic homogeneous condition; third, mechanically shaping the plastic body under a rotary pressure; fourth, introducing air into the molded body at the instant the pressure is relieved; fifth, glazing the insulator before firing, and, finally, firing the glazed insulator.

Having thus described my invention, what I claim, and desire to secure by Letters Patent, is—

1. The herein-described "wet process" of making insulators consisting in liquefying and mixing the raw clay to a homogeneous condition and then expelling sufficient moisture from the mixture to render it plastic, then mechanically shaping the wet plastic mass under a uniformly and gradually progressive rotary pressure.

2. The herein-described process of making insulators consisting first in rendering the clay homogeneous and plastic, and then hollowing the wet plastic mass under a rotary axial uniformly progressive pressure to form the interior contour.

3. The herein-described "wet process" of making insulators consisting in liquefying and mixing the raw material to a homogeneous condition and then expelling sufficient moisture from the mixture to render it plastic, then mechanically shaping and freeing the interior of the wet plastic body under a uniformly and gradually progressive rotary wiping pressure.

4. The herein-described "wet process" of making insulators consisting in liquefying and mixing the material to a homogeneous condition and then expelling sufficient moisture from the mixture to render it plastic, then mechanically shaping the wet plastic body under a gradually and uniformly progressive rotary pressure and introducing air against the compressed surface at the instant the pressure is relieved.

5. The herein-described process of making insulators consisting first in rendering the clay homogeneous and plastic, and then hollowing the wet plastic mass under a rotary axial uniformly-progressive pressure and sliding contact imposed on the interior contour, glazing the insulator thus formed and firing the glazed insulator.

6. The herein-described "wet process" of making insulators consisting in liquefying and mixing the clay and expelling part of the moisture to render the clay plastic, and then hollowing the wet plastic body under a rotary and sliding pressure imposed on the interior of the body and introducing air against the compressed surface at the instant the pressure is relieved, glazing the insulator thus formed, and firing the glazed insulator.

7. The herein-described process of making insulators consisting first in rendering the clay homogeneous and plastic, and then hollowing the wet plastic mass under a rotary axial pressure imposed on the interior of the mass to form the interior contour, glazing the green insulator thus formed and then firing the same.

8. The herein-described "wet process" of making insulators consisting in liquefying and mixing the material to a homogeneous condition and then expelling sufficient moisture from the mixture to render it plastic, then mechanically shaping the wet plastic body under a rotary pressure, glazing the green insulator thus formed and then firing the same.

9. The herein-described "wet process" of making insulators consisting in liquefying and mixing the raw clay to a homogeneous condition and then expelling sufficient moisture from the mixture to render it plastic, then placing a sufficient quantity into a suitable mold to shape the interior of the insulator then hollowing the wet plastic body by the simultaneous application of gradually and uniformly progressive rotary pressure and heat, and introducing air against the compressed surface at the instant the pressure is relieved.

10. The herein-described process of making insulators, consisting in hollowing a wet plastic mass under rotary axial pressure uniformly progressive during the operation, simultaneously submitting the article to the action of heat, then subjecting it to the action of air at normal temperature, then glazing the article so formed and finally vitrifying the same.

In witness whereof I have hereunto set my hand this 29th day of September, 1902.

FRED M. LOCKE.

Witnesses:
M. W. BURKE,
W. C. DRYER.